Sept. 5, 1939.  W. E. HAUPT  2,171,829
AUTOMATIC DRIVE AND CLUTCH MECHANISM
Filed July 9, 1932
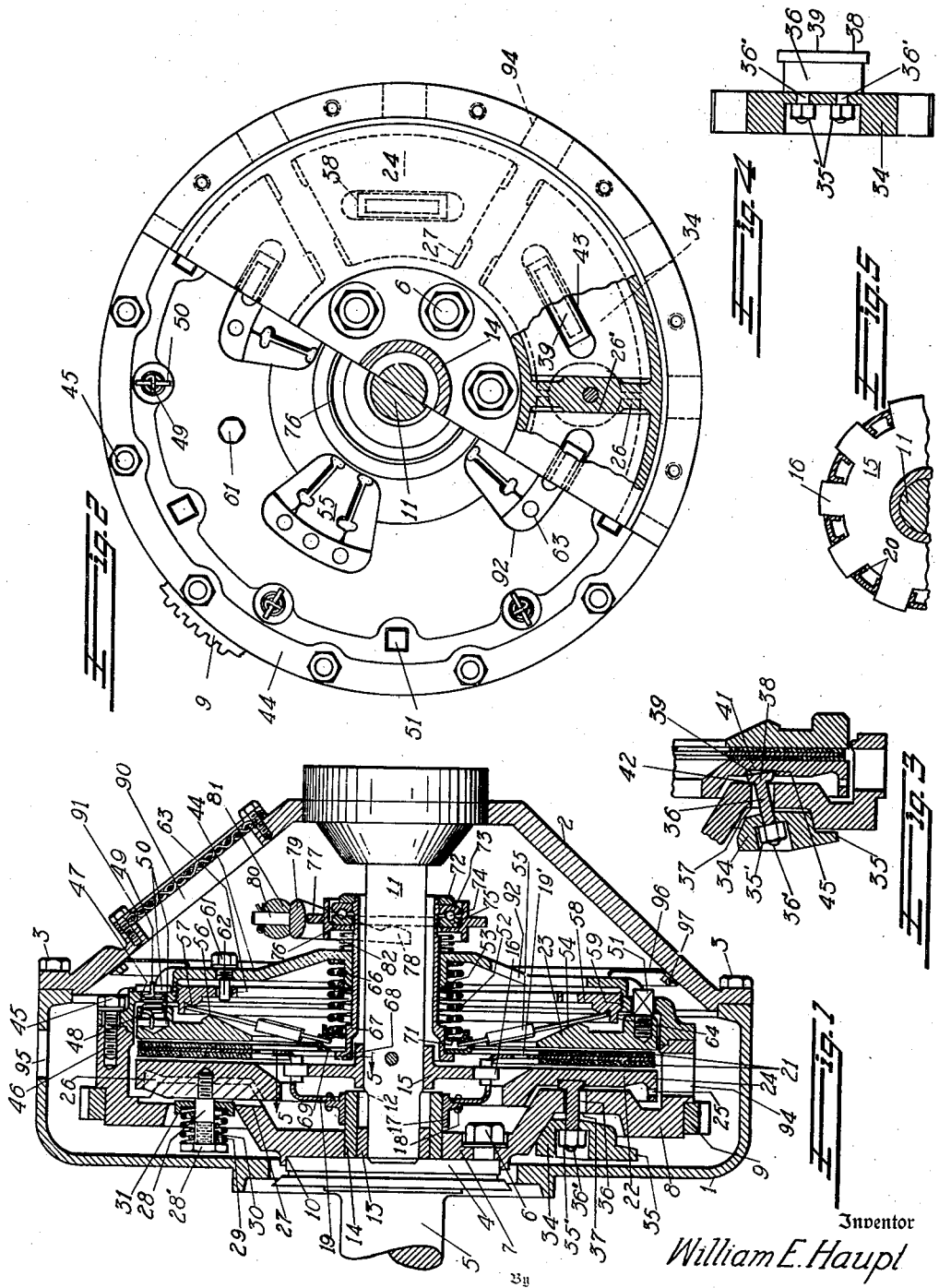
Inventor
William E. Haupt
Strauch + Hoffman
Attorneys Patented Sept. 5, 1939

2,171,829

UNITED STATES PATENT OFFICE 2,171,829

AUTOMATIC DRIVE AND CLUTCH MECHANISM

William E. Haupt, Westville, N. J., assignor to Automatic Drive & Transmission Company, New York, N. Y., a corporation of New Jersey Application July 9, 1932, Serial No. 621,714

11 Claims. (Cl. 192—105)

The present invention relates to an improved slipping drive and clutch mechanism for controlling the torque transmitted by a driving shaft to a driven shaft. More particularly the present invention relates to an improved slipping drive and clutch mechanism of the self-operating or automatic type, particularly adapted for motor vehicle or similar drives.

The present invention comprises improvements in automatic or self-operating drive and clutch mechanisms of the type disclosed in copending applications, Serial No. 580,172, filed December 10, 1931, which issued as United States Patent No. 1,979,880, on November 6, 1934, and in Serial No. 488,757, filed October 15, 1930, which issued as United States Patent No. 2,003,324 on June 4, 1935. In Patent No. 1,979,880, centrifugal drive and clutch operating weight levers are disposed around the periphery of the clutch driving and driven plates, which arrangement requires the use of an unnecessarily large space for reception of a unit of sufficient dimensions to provide a satisfactory transmission of given amounts of power. Unless the clutch parts are excessively large with the arrangement of said Patent No. 1,979,880, lower percentages of graphite and high coefficients of friction must be used in the clutch plates, and high engaging pressures must be applied thereto, which accordingly decreases smoothness and increases the temperature of operation. As increases of temperature of the clutch material decrease coefficient of friction of the novel material utilized, the parts must be sufficiently large to provide effective cooling in operation. In addition, in view of the application of the necessarily heavy engaging pressures at the outer periphery of the clutch plates, the plates must be made unnecessarily heavy to resist distortion and warpage thereof under the heavy pressures and high temperatures attending operation thereof. Accordingly, while it has been found feasible to produce an operative clutch embodying the mechanical arrangements disclosed in said Patent No. 1,979,880, within the cost, space and weight limits demanded for low cost motor vehicle clutches, considerable improvement may be effected thereover by use of the drive and clutch mechanism disclosed in said Patent No. 2,003,324 which was developed to provide a more compact, low cost, light weight clutch arrangement utilizing the novel material of said Patent No. 1,979,880, for motor vehicle installation, and for efficient utilization of the space available for automatic types of clutches in existing automobiles.

By providing a centrifugally operated weight arrangement in which the weight members extend through the web of the flywheel, operating pressures are applied to the drive and clutch plate approximately opposite the center of the engaging driving surface and considerable economy of space and weight is effected over that disclosed in said Patent No. 1,979,880. A large number of said slipping drive and clutch mechanisms using a facing material with approximately 40% graphite in the original mixture from which the clutch is formed, have operated for long distances and have stood up under severe treatment in standard Ford and other automobiles, in combination with standard gear sets or transmissions.

Ventilation of the drive and clutch mechanisms of said copending application to remove solid freed lubricant from the clutch facing and to provide cooling for the driving and clutching parts is provided for solely by circulation of the air in the clutch casing as induced by rotation of the drive and clutch parts, and radiation from the clutch parts, leaving the dust in the casing. The engaging pressures are also comparatively high on the clutch plates, with the result that in operation, particularly under abuse, excessive temperatures are generated with resultant lowered coefficient and undesirable slippage and warpage of the drive and clutch plates and undesirable settling of lubricant and other dust within the casing on the surface of the facing occurs, giving undesirable variability and lack of uniformity in operation, which, while not sufficient to prevent practical operation, reduces the wear and desirable operating characteristics of the drive and clutch mechanisms as compared to the improved action secured in the drive and clutch mechanism embodied in the present invention.

By providing proper materials in proper construction of the clutch plates and a forced draft for cooling and ventilating the drive and clutch mechanism, I have been able to provide a compact, thoroughly ventilated and highly efficient combined slipping drive and clutch mechanism, utilizing the improved drive and clutch facings of said application Serial No. 580,172, which embody forty percent to sixty percent of graphite in the original mixture from which they are formed, in which the driving and clutch action is improved to such an extent, that for vehicles of the pleasure car class and broader commercial types of vehicles, a transmission mechanism involving a single forward gear reduction may be utilized in combination therewith with entire satisfaction, giving a clutch life greater than that secured with existing conventional manually operable clutches in combination with a three speed transmission. This is made possible due to the fact that with the improved slipping drive and clutch mechanism of the present invention, a multiplying gear ratio is needed for driving purposes in the motor vehicle only when the torque demands are higher than the maximum torque deliverable by the motor, as for example in starting the vehicle on a substantial grade. For normal driving purposes, the vehicle may be started with a transmission in high gear because of the special characteristics of the drive and clutch facings and plate constructions, the regulated torque delivering slippage developed, and smooth uniform application of power by my improved mechanism which permits the slippage necessary to pick up the load, but prevents slippage when the load is being driven at an operating speed predetermined by the clutch design.

Prior clutch mechanisms of the automatic or self-operating type, wherein manual declutching is effected by withdrawing the positive plate away from the range of action of the centrifugally operated plates, due to the comparatively heavy pressures required in clutches of this character, have the disadvantage of rapidly wearing out the throwout bearing employed therein through the rotation of said bearings and their association with the clutch parts.

Accordingly it is a primary object of the present invention to provide an improved compact efficient automatic or self-operating drive and clutch mechanism especially adapted for automotive drive purposes, but which is applicable to a wide variety of industrial power drives.

Another object of the present invention is to provide a novel compact, ventilated, automatic or self-operating drive and clutch mechanism that may be manufactured at low cost by quantity production methods and will function satisfactorily within the weight and space limits usually allotted to a clutch in an automotive vehicle, to pick up the load with a slipping drive in normal operation with the transmission in high gear, and which will drive the vehicle without any slippage thereof while the load is being driven at normal speed, whereby a highly efficient low cost drive for vehicles is provided.

Another object is to provide an automatic or self-operating drive and clutch which is so designed as to pick the load up in stages whereby an extremely smooth acting clutch is provided.

A further object of the present invention is to provide centrifugal weights that will cooperate with the automatic plate in such a manner that the friction involved during their operation is negligible, and the pressure exerted by them will be applied uniformly to the plate.

Another object of my invention is to provide an improved throwout finger mechanism for causing even application of force to the throwout bearing thereby avoiding binding of the parts during declutching operations.

Another object of the present invention is to provide a drive and clutch mechanism of the character mentioned wherein all of the frictional elements are carried by a single rotating member so that constant alignment of the same is assured under all conditions of operation.

A still further object of the present invention is to provide a drive and clutch mechanism of the character mentioned that is so designed, that should the driving and driven shafts be out of alignment, or should uneven lift of the automatic plate occur, clutch operation will nevertheless be smooth, and uneven wear of the clutch plates will be avoided.

Another object of the present invention is to provide a novel automatic plate for a clutch of this character that is so designed that it will dissipate heat rapidly, will not distort under the most severe operating conditions, and has novel means associated therewith for keying the same to the flywheel so that it may freely move axially for clutching and declutching operations, and yet be caused to rotate therewith.

Another object of the present invention resides in the provision of a novel manual throwout mechanism for the positive plate, and which has associated therewith a throwout bearing assembly that is so designed and so located that it will operate smoothly under all operating conditions and will have a long operating life.

Still further objects of the present invention will appear from the following detailed disclosure of the preferred embodiment thereof and are defined by the terms of the appended claims.

As shown in the drawing:

Figure 1 is a longitudinal sectional view of the automatic drive and clutch mechanism of the present invention.

Figure 2 is a rear view of the drive and clutch mechanism disclosed in Figure 1, with the housing removed therefrom, and with half of the cover plate removed and showing parts in section for more clearly illustrating the structure involved.

Figure 3 is a fragmentary view with parts in section of certain parts of the drive and clutch mechanism illustrated in Figure 1 with the automatic weights disposed in the positions they assume when the clutch plates are fully engaged in automatic operation, and Figure 4 is a detail view of one of the centrifugal weights employed in the clutch illustrated in Figure 1, with parts thereof in section.

Figure 5 is a sectional detail view, taken approximately on the line 5—5 of Figure 1 as viewed when looking in the direction of the arrows.

With continued reference to the drawing, wherein like reference characters refer to like parts throughout the several views thereof, a bell housing 1, having a cover or complemental housing member 2 secured thereto by bolts 3 or the like houses the clutch mechanism and they will both be referred to hereinafter as the clutch housing.

Secured to flange 4 of engine or driving shaft 5, by means of bolts 6 or the like is the web portion 7 of flywheel 8. Flywheel 8 is provided on its periphery with the usual starting gear 9. Flange 4 fits into a recess 10 formed in flywheel 8.

Disposed in axial alignment with shaft 5 and mounted for rotation is driven shaft 11 which is reduced at 12 at one end and journaled in a suitable anti-friction bearing secured in the flywheel web. This bearing may be of any desired type, however, in the present instance it is of the oilless type due to the inaccessibility thereof, and consists of a bushing 13 held in a retainer 14 and is made of a suitable material impregnated with graphite or other suitable lubricant. Shaft 11 is adapted to have the other end thereof operably connected to a suitable gear changing apparatus for amplifying the torque applied to the final driven member and is journaled in a suitable anti-friction bearing assembly secured to housing member 2.

Rigidly secured to driven shaft 11, by means of a pin or the like, is a disk 15, having spokes or teeth 16 formed thereon. Rotatably mounted on the outside of bushing 14 is a hub 17, which is provided with a flange 18. A relatively thin metal disk 19, having an offset central portion enclosing disk member 15 is secured to flange 18 of hub 17 by means of rivets or the like. Disk 19 constitutes the driven member and is seen to be capable of axial movement upon bushing 14, as well as rotational movement thereon. At regular intervals around the cylindrical wall of disk 19, slits are made and bearing members 20 deflected from the body thereof. Spokes or teeth 16 of disk 15 extend through the apertures thus formed and are adapted to seat rather closely against bearing members 20 for sliding movement therewith.

From the structure so far developed it is seen that driven member 19 is mounted for axial and rotative movements upon bushing 14, and connected for rotation with driven shaft 11 through spokes 16 on disk 15. In view of the fact that the distance of spokes 16 from the axis of rotation is relatively great, the pressure of bearing members 20 upon spokes 16 is relatively low, and accordingly resistance to proper sliding movement during clutching and declutching operations is thereby avoided. While hub 17 has been disclosed as being directly journaled upon bushing 14, it is to be understood that a suitable anti-friction bearing could be employed at this point if desired.

Plate 19 is provided around its face with a plurality of apertures 19' for a purpose that will presently appear.

Each face of disk 19 near the periphery thereof is provided with a facing 21 which may consist of any material that has the required characteristics to give the correct frictional gripping force and at the same time has wearing qualities adapting it for this purpose.

I prefer, however, to use the lubricated type of material disclosed in said United States Patent No. 1,979,880 of Charles B. Heinrich, embodying large percentages of graphite, which in practice have given very satisfactory results in a clutch of this character. Frictional facings 21 may be secured to the disk 19 in any suitable manner as for instance by means of rivets or the like. Each of the facings cooperate with a suitable annular plate for effecting a driving connection between the driving shaft 5 and the driven shaft 11. Plate 22, which is adapted to engage one of the facings, we term the automatic plate, and plate 23, which is adapted to cooperate with the other facing is termed the positive plate.

The construction of automatic plate 22 and its actuating mechanism will now be described. Plate 22 has a strengthening rib 24 formed on the face thereof in the region of its periphery for the purpose of giving the plate rigidity and preventing distortion or warpage thereof during operation. Rib 24 is provided with a plurality of apertures 25 for the purpose of allowing ventilating air to pass therethrough in a manner presently to be described. Integral, radial keys 26 are formed on one face of the plate. The number of keys employed in a particular installation is determined by a consideration of the forces that they must transmit, for instance, in the clutch shown, which is designed for relatively heavy work, six equally spaced radial keys having driving bosses 26' formed thereon are used. The flywheel web is provided with radial slots 27 which slidably receive the keys 26. The walls of slots 27 form driving faces for engaging the bosses 26' formed on the keys and causing rotation of plate 22 therewith. Each of the keys is bored and tapped to receive a threaded holdback stud 28.

Threaded upon the outer end of stud 28 is a nut member 28' having a head of substantial diameter. Seating against the head of nut 28' are a pair of compression springs 29 and 30, constituting a holdback spring assembly.

The other end of each spring assembly 29 bears against a cup or like supporting member 31 which abuts the rear face of the flywheel web that serves to bridge the key slots therein. While it is not absolutely essential, it is preferable to provide plate 22 with as many hold back spring assemblies as there are driving keys in order that a uniform holdback pressure may be exerted upon the plate. When the holdback spring assemblies are installed in the clutch, springs 29 are placed under an initial compression, while springs 30 merely rest loosely in position for a purpose that will presently appear.

It will be seen from the structure just developed that the holdback spring assemblies uniformly exert pressure on plate 22 and urge it toward the flywheel web. It is also seen that the radial keys 26 cooperating with the walls of slots 27 formed in the flywheel web cause plate 22 to rotate with the flywheel and yet permit free axial movement thereof.

Plate 22 is caused to move away from the flywheel web against the action of the holdback spring assemblies for clutching engagement with the facings 21 of member 19 by means of a centrifugal mechanism that is responsive to speed variations of the flywheel by which it is carried. Centrifugal weights 34 are preferably segmental in shape to fit within the flange of the flywheel and are preferably of the same number as the holdback spring assemblies and driving keys. Each weight 34 is provided with an inclined face 35 adapted to contact with the flywheel rim when it is in its extreme outward position. The weights are further provided with elongated rectangular lever sections which are secured thereto by means of nuts 35', which are disposed in a recess formed in the body of the weight and are threaded upon extremities 36' of levers 36. Levers 36 extend through chordal slots 37 formed in the flywheel web which are disposed between the key slots 27 and terminate short thereof. Lever sections 36 carry at their extremities heads 38, each of which is provided with a flat face 39 that abuts the bottom face of an elongated rectangular bearing recess 41 formed in automatic plate 22. Heads 38 are also provided with faces 42 adapted to abut the surface of the flywheel web, the edge of which is designed for sliding and fulcruming engagement therewith during the operation of the weights. Heads 38 also have their outer sides relieved to provide knife-like edges 43 which are adapted to fulcrum and seat in the angle defined by the bottom and side walls of the recesses 41.

It will therefore be seen, that as the speed of the flywheel increases weights 34 will gradually swing outward about their edges 43 as a pivot in response thereto. As this occurs, faces 42 of heads 38 will abut and slide on the flywheel web and the edge 43 thereof will engage automatic plate 22 forcing the plate away from the web and into clutching engagement with the facing carried by disk 19. It will be noted that there is very little sliding engagement of parts in this arrangement since the contact of edge 43 with plate 22 is of a knife-edge pivotal character. The sole sliding movement is at the edges of surfaces 42. This movement is small and little frictional resistance exists, so that the plate 22 is accordingly given a smooth and easy movement and clutch grabbing is avoided.

The mechanism associated with positive plate 23 will now be described. A combined housing and reacting member 44 is secured to the flywheel by a series of cap screws 45 threaded into the flywheel as at 46. As seen in the upper corner of Figure 1, housing member 44 is provided with a plurality of recesses 47 which align with sockets 48 formed in the rear face of positive plate 23. Tension springs 49 have one end thereof secured within the sockets 48 in positive plate 23 and the other end thereof secured within aperture 47 in the reacting member 44, and are held in their respective members by means of pins 50 or the like. Springs 49 are thus seen to urge the plates 23 away from the flywheel web into disengaged position.

Positive plate 23 is mounted for movement axially of shaft 11, and for rotation with housing 44 by means of studs 51 that are tapped into the rear face of positive plate 23, and have the squared head portions thereof slidably mounted in square apertures formed in the housing 44.

Plate 23 is resiliently urged toward the flywheel web by springs 52 and 53, acting through the medium of clutch fingers 54. Clutch fingers 54 are evenly spaced about the periphery of plate 23 and are enlarged and angularly deflected at 55 to form fan blades. Clutch fingers 54 cooperate with a rounded angular rib 56 provided on the rear face of plate 23 and with a similar rib 57 formed on a ring member 58 which is threaded into cover 44 as at 59. Ring member 58 may be adjusted toward and away from the positive plate by rotating the same, and is held in adjusted position by means of a bolt 61, which has a reduced portion 62 thereof seating in an opening 63 formed in ring member 58. Ring 58 has an annular flange 64 formed thereon which cooperates with the ends of levers 54 for preventing them from moving outwardly under the influence of centrifugal force.

In this connection it should be particularly noted that automatic plate 22, positive plate 23, and driven member 19, are all supported by the flywheel. Therefore perfect parallelism of these members is assured at all times, regardless of any misalignment that may exist between the flywheel and driven shaft 11. If shaft 11 happens to be slightly off-center with respect to flywheel 8, or angularly disposed with respect thereto, no relative motion between the clutch elements will occur when they are fully engaged since all the sliding that compensates for such misalignment occurs between spokes 16 and bearing members 20. It is further seen, that should automatic plate 22 lift unevenly, due to slight inaccuracies in machining the heads 38 thereof, plate 19, through its resilience and the slight play present at its hub 17, will assume the angle taken by plate 22, and likewise positive plate 23, which is resiliently backed, will take the same angle, and parallelism of the plates is established and maintained and wear of the same in spots is clearly avoided. Therefore plates 19, 22 and 23 will rotate as a unit insofar as displacement with respect to each other is concerned, during slipping drive conditions as well as when the plates are in non-slipping engagement, insuring smooth clutch operation and long life of facings 21.

From the structure just developed it will be seen that as the inner extremites of fingers 54 are swung in an arc, plate 23 will be moved toward and away from driven disk 19. The mechanism by which the levers are caused to swing in this manner will now be described. Slidably mounted for axial movement in a flange 66 formed in cover member 44 is a sleeve 67 which has a flange 68 formed on one end thereof. Embracing sleeve 67 and seating against flange 68 thereof is a cup member 69 having notches formed in the periphery thereof for the reception of the inner extremities of fingers 54. Cooperating with the inner extremities of fingers 54, and with cup member 69 is a cup member 71 in which springs 52 and 53 seat. The other ends of springs 52 and 53 react against the inner face of cover 44. It is thus seen that the inner extremities of fingers 54 are clamped between members 69 and 71 and are urged to the left as shown in Figure 1 in such a manner as to cause the positive plate to move toward driven member 19 and automatic plate 22.

Fingers 54 are swung into declutching position, so as to allow springs 49 to withdraw the positive plate from clutching position, by means of a thrust bearing assembly mounted on the outer end of sleeve 67. Threaded on the end of sleeve 67 is a nut member 72 to which is secured a ball race member 73. Antifriction balls 74 are disposed between ball race member 73 and a similar ball race member 75 which is secured to member 76. Member 76 has an annular flange 77 formed thereon which cooperates with a pair of throwout fingers 78, which are preferably integrally formed and terminate at their upper ends in a yoke 79 having a pivot member 80 formed thereon. Pivot member 80 is journaled in shaft 81 and held against removal therefrom by means of a cotter pin or the like. A clutch pedal (not shown) having the usual light reacting spring associated therewith is mounted on the base of shaft 81 for causing rotation thereof for declutching operations.

This throwout finger structure gives flange 77 an even lift at all times because, should one finger 78 strike flange 77 before the other finger 78 comes into contact, the first finger could not urge flange 77 into declutching position because further movement of shaft 81 merely causes the finger assembly to rotate about its pivot 80. When both fingers are brought into contact with flange 77, further movement of shaft 81 will cause clutch disengagement to occur.

A light retaining spring 82 encircles sleeve 67, and bears against cover member 44 at one end and member 76 at the other end for holding flange 77 away from the throwout fingers when declutching operations are not taking place for causing the entire throwout bearing to rotate as a unit, and thereby avoiding wear on the balls.

From the structure just developed it will be seen that the throwout bearing is supported on sleeve 67 which in turn is supported by cover 44. Consequently all parts rotate together when the throwout fingers are not engaged therewith, and there is no relative movement between spring 82 and its associated parts. It will be also seen, that should the cover and consequently sleeve 67 be eccentric with respect to the center of rotation thereof, the throwout bearing will nevertheless operate perfectly at all times since the fingers 78 that contact therewith are stationary and the flange 77 associated with the throwout bearing is also stationary during declutching operations.

The clutch is initially adjusted at the factory by rotating adjusting ring 58 in the proper direction and to move positive plate 23 toward or away from automatic plate 22 to establish proper clearance between them. After the adjustment has been made plate 58 is locked in place by means of bolt 61. After the clutch is in use all adjustments for wear may be made externally thereof by means of devices associated with the throwout shaft. When springs 52 and 53 are initially placed in position in the clutch, spring 52 is put under substantial initial compression, or is preloaded, while spring 53 merely rests loosely in the assembly for a purpose that will presently appear.

The clutch in Figure 1 is shown in automatic position with the positive plate spaced from the automatic and driven plates (which position is maintained by providing the clutch pedal with a suitable latch of the type shown in the copending application above referred to) and the engine is presumed to be operating at idling speed since the automatic weights are shown in their innermost positions. As the flywheel is accelerated, the weights 34 will gradually swing out and pivot about their knife edges 43 causing face 42 of head 38 to engage the flywheel web, thus forcing the automatic plate to be moved away from the web against the action of springs 29 and 30. Due to the reaction of springs 29 and 30 the movement of the weights will be under control and there will be no tendency for them to vibrate or undergo other undesirable movements. When the speed is sufficiently great, automatic plates 22 engage facing 21 of the driven clutch member 19. Upon further movement of the automatic plate, clutch member 19 will slide longitudinally on disc 15 and bushing 14 and the other facing of clutch member 19 will be brought into contact with positive plate 23. The portion of the operation that has just been described will be termed hereafter as the first clutching stage operation.

The second operation is initiated when facing 21 first contacts the face of positive plate 23. As pressure on positive plate 23 is further increased spring 52, which is under substantial initial compression resists the weight and plate movement and a torque of small magnitude is transmitted to the driven shaft 11. As spring 52 is further compressed, the magnitude of the torque transmitted is gradually increased, and shaft 11 is accelerated without grabbing. When spring 52 has been sufficiently compressed so that spring 53 comes into play, the second stage of operation may be said to be at an end and the third stage commenced.

Spring 53 is gradually compressed and at the same time secondary holdback springs 30 come into play and retard the movement of weights 34 to some extent, thus causing the plates to be engaged under gradually increasing pressures during the initial portion of the third stage of clutch engagement, which pressure rapidly builds up near the end of the third stage, and finally the pressure becomes sufficient to prevent any slippage and the weights come to rest against the flywheel rim. While the second and third stages of clutching operation merge into each other so far as actual operating characteristics are concerned, they are distinct in some respects since no driving couple is established until spring 53 is under substantial compression, when the third clutching operation may be said to be complete. The plates are then in firm driving engagement with each other and there is no slippage between the driving shaft and the driven shaft.

In connection with this device it will be noted that when the clutch pedal is unlatched, allowing fingers 54 to swing to their limit under the influence of the action of spring 52, the positive plate is given such a movement as to cause it to engage and drive the driven member, in spite of the fact that the engine may be only operating at idling speeds or is stationary, with weights 34 disposed in their innermost positions. This obviously establishes a direct drive from the driven member regardless of the position of the weights. The only force tending to hold the plates together when the clutch is employed in this manner is that exerted by spring 52. This is not a disadvantage, however, because the clutch is only employed in this manner under low torque conditions as for instance, to turn the engine over by towing or coasting the vehicle for starting purposes, and since the plates are stationary when engaged the static friction present is sufficient to prevent slippage. In the automatic clutches that have been heretofore proposed the positive plate is backed up by a single or a series of single springs and accordingly, no staging of engaging pressures is effected in such devices. The only type of slipping drive clutches that have been commercially successful in automotive drives are those in which the clutch facings have been of a lubricated material having low coefficients of friction under low pressure which gradually rises in pressure until when full torque is being transmitted and no slippage exists the coefficient of friction is fairly high. However, even at the upper limit, the coefficients are substantially below those of clutch facings in comparable conventional manually operable clutches, thus requiring the use of heavy backing springs to produce a proper frictional grip in such automatic clutches. The full range of movement of the clutch plates between their fully engaged and disengaged positions together with the necessary limitations of maximum pressures to permit convenient manual declutching of a practical automotive clutch, limits the movement to a comparatively narrow pressure range when a single series of backing springs is used. This necessitates the use of higher coefficients with a friction clutch when a single series of backing springs is used than is necessary with my improved clutch so far described embodying a multiple backing spring, since with my new spring arrangement with the same movement of the automatic plate available, the initial engaging pressures may be materially lowered and much higher final engaging pressures may be employed because of the controlled action of the weights and the reaction thereto.

The lowering of initial engaging spring pressures secured by my improved construction permits easier manual declutching operation due to the lighter spring pressures at speeds where normal declutching operations are generally performed in motor vehicle control and permits the use of clutch facings containing a larger percentage of lubricant and a lower coefficient of friction with the same automatic plate movement, as compared to the prior clutches embodying a single series of springs backing the positive plates. The lowering of coefficients of the facing material secured in my improved clutch gives a smoother pickup in slipping drive and a longer clutch life. The use of a multiple backing spring to build up the operating pressures in stages permits a relatively slow building up of pressures at the lower clutch speeds when the clutch is picking up the load, and a rapid building up of pressures after the load is moving to secure a non-slipping drive, and even when the clutch facings contain as high as 50% to 60% or more of graphite in the original mixture from which the clutch facings are formed.

The multiple holdback spring assemblies play an important part in this organization, because, as above stated, the range of movement of the automatic plate and accordingly that of the positive plate, must be small. Therefore the second stage backing spring 53 must be relatively stiff in order to build up the plate pressures sufficiently high for non-slipping drive conditions at the limit of the movement of the automatic plate. It has been found that with backing springs of this character, the clutch action may be improved during the final stage of clutching engagement by providing secondary holdback springs 30 which come into play before the secondary backing spring 53 starts to undergo compression, and accordingly springs 30 modify movement of the automatic plate and consequently the action of the automatic weights, giving the clutch improved smooth engaging characteristics in the final engaging stage. This improvement is effected by retarding the rapid build up of pressures that occurs when no secondary holdback springs are used, due to the fact that the force exerted by the centrifugal weights varies as the square of the speed of rotation, and therefore multiplies rapidly in the final engaging stage. Applicant has operated clutches having multiple holdback springs for the automatic plate, and only a single spring or a single series of springs for the positive plate, and found that the operation thereof is superior to that obtained in an automatic clutch employing single holdback springs for the automatic plate and a single spring for backing up the positive plate, and this form of the invention is to be understood as embraced by the present application. Accordingly, while prior automatic clutches of various single pressure springs have been found commercially practical, my improved clutch gives a materially improved smoothness in slipping drive, increased life and easier normal clutching operation.

It will be noted that the fulcrum edges 43 of the weight levers as shown in Figure 1 are disposed approximately midway between the inner and outer peripheries of plate 22, and hence the weight levers act upon the automatic plate in line contact for a substantial distance along the face thereof and applies substantially uniform pressure opposite the center of the engaging faces, thus minimizing warping and twisting of the plates under the pressures of operation. The uniform distribution of spring actuated fingers 54 around the periphery of the positive plates provides uniform spring reaction for opposing the action of the automatic plates thereby.

Since slippage is inherent in the operation of a clutch of this type, heat is generated therein, and solid lubricant is freed from the facings during operation thereof. The heat and freed material should be eliminated, and to this end means are provided for ventilating and cooling the clutch by an air stream, the air stream abstracting heat from the clutch parts by convection and carrying away the solid freed lubricant therewith. Clutch housing 2 is provided with an aperture 90 in which is mounted a suitable screen 91 to prevent extraneous matter carried by the air from being introduced into the clutch mechanism. Cover 44 is provided with apertures 92 of substantial area for permitting air to be drawn by fan blades 55 into the clutch mechanism. It is noted that the action of fan blades 55 produces a partial vacuum in the region of apertures 92 and thus causes air to be induced therein. The air flow induced by the action of fan blades 55 is drawn through screen 91 and along shaft 11 toward the clutch plates. A portion of the air stream when the plates are disengaged, passes between facing 21 and plate 23, and between plate 23 and cover 44 at one side of driven disk 19, and a part of the air stream passes through the openings 19' formed in disk 19 and between facing 21 and plate 22 removing dust and solid freed lubricant in this region. An air stream also passes between automatic plate 22 and flywheel web 7. The air passes over the facings and is heated, and the heated air and the entrained dust is exhausted from the clutch structure into the clutch housing by means or apertures 94 formed in the flywheel rim.

It is seen by this arrangement that air is distributed on both sides of the plates and hence the dissipation of heat from each side thereof is approximately equal. Therefore, warping or torting tendencies, produced by uneven expansion of the metal which in turn is caused by nonuniform heat content thereof, are avoided for the reason that the entire area of each of the plates is maintained at a substantially uniform temperature. While the heated air may be withdrawn or exhausted from the clutch housing in any suitable manner, I prefer to provide a single aperture 95 therein and associate a suitable valve, therewith for controlling the air flow from the clutch housing, since it is desirable in cold weather to restrict the dissipation of heat from the clutch parts due to the fact that the frictional coefficient of the facings employed decreases as the temperature thereof increases, and by controlling the temperature properly, the clutch operating characteristics may be varied or controlled at will. The operator of the vehicle can then readily adjust the flow of ventilating air through the clutch mechanism and thus properly compensate for both the variation of heat and dust generated in the clutch and the initial temperature of the ventilating air. This is an important feature since the coefficient of friction is dependent upon the temperature, and since the amount of slippage depends upon the coefficient of friction, extreme conditions can cause harsh engagement on one hand or extreme slippage on the other hand.

In order to prevent the heated dust-laden air exhausted from apertures 94 in the flywheel web from reentering the clutch mechanism and for more efficiently producing a partial vacuum in the chamber disposed to the right of the clutch mechanism shown in Figure 1, I have provided an annular baffle member 96 which is preferably made of sheet metal and is secured to the inner wall of the clutch housing by means of screws 97 or the like. Baffle member 96 has the inner periphery thereof disposed closely adjacent to the smooth outer face of cover member 44 and cooperates therewith to prevent any substantial flow of air therebetween.

From a consideration of the structure developed so far, it will be seen that automatic plate 22 is moved by the centrifugal weights a certain distance limited by contact of the weights with the flywheel web. Accordingly, if at this time the positive plate could be moved to the right in Figure 1 sufficiently so that the clutch member 19 would not be clamped between it and the automatic plate, no driving effort can be transmitted from the driving to the driven shaft even though the centrifugal weights are in their outermost position. Moreover if positive plate 23 is allowed to move to the left sufficiently to clamp clutch member 19 between it and the automatic plate with sufficient pressure when the automatic plate is in retracted position with the centrifugal weights in the position they would take when the engine is idling or stationary, it will be seen that a driving connection will be secured. Such operation is desirable or even necessary for several reasons. For instance, in the winter when the motor is cold or the battery is low, it is desirable to connect the clutch driving and driven members in positive engagement with the engine so that the car can be pushed or coasted in order to turn the engine over, or when stopping on a steep hill, a positive engagement of the clutch in low or reverse gear will provide an additional emergency brake that cannot be inadvertently disengaged or if the motor stalls due to the lack of fuel or any other cause, the car can be pulled out of any dangerous position by driving the car in low gear with the starting motor.

During all other normal driving operations, the positive plate is held in the position shown in Figure 1 by means of any suitable latch means for holding the clutch pedal in intermediate position.

With the above described clutch installed in a motor vehicle having a conventional three speed transmission, if it is desired to start the vehicle, and the parts are in the position in which they are shown in Figure 1, and the vehicle is on level ground, the transmission is placed in high gear and the engine accelerated. As the engine gains speed the weights 34 gradually swing outwardly and cause automatic plate 22 to move toward and engage the clutch member 19 against positive plate 23. The clutch then, under automatic operation, transmits a gradually increasing torque to the rear wheels and the vehicle is started smoothly and without shock. When the vehicle, and consequently the engine, obtains sufficient speed, the weights will have swung out to their furthermost limits and will rest against the flywheel rim and the plates will be in tight engagement with no slippage between them, and an automatic positive drive from the driving to the driven shaft is effected. When operating the vehicle in this manner, all that it is necessary to do to bring it to a stop is to release the accelerator and apply the brakes. When the vehicle has decelerated to a speed corresponding substantially to engine idling speed, through the combined braking action of the engine and the brakes, the centrifugal mechanism will release the clutch and the vehicle may be brought to a complete stop by continued application of the brakes, or, if traffic conditions permit, the accelerator may be depressed and the engine speed accelerated to cause almost immediate reengagement of the clutch and the vehicle is again picked up in high gear. When operating in high gear, or any other gear for that matter, and a grade is encountered that requires more torque than the engine can deliver in that particular gear, the engine will naturally decelerate under such excess load, and when sufficiently decelerated the weights 34 will swing inwardly to a slight extent and permit slippage between the clutch plates. Since it is an inherent characteristic of an internal combustion engine to deliver more torque as the speed thereof is increased, the speed of the engine, through the slipping conditions existing at this time, will be accelerated sufficiently for it to develop sufficient torque to carry the vehicle over the grade, thus doing away with the necessity of shifting the transmission into a lower gear.

As the vehicle gains speed up the grade, or the vehicle again reaches substantially level ground the weights 34 will again swing out into contact with the flywheel rim and will thus exert sufficient pressure on the automatic plate to again establish a non-slipping drive between the clutch plates and the driven member. This mode of operation is made possible by the lubricated character of the facing material that is employed in the present clutch mechanism, in combination with the effective ventilating and dust removing provisions that are incorporated therein. It is therefore seen that this mechanism constitutes a drive as well as a clutch mechanism.

When the automatic plate, in response to the centrifugal weights has moved to engaging position against the action of its holdback springs, the positive plate may be backed away from the remaining clutch plates by manual depression of the clutch pedal. Hence, there is no contact between the plates, and no driving connection between the driving and driven shaft. In traffic, when it is desired to get the vehicle away quickly and in starting up grades, the clutch pedal may be operated in this manner to disengage the clutch between each gear shifting operation as in a vehicle of the type provided with a conventional manually operable clutch. However, with the present drive and clutch mechanism, it is contemplated to start the vehicle in high gear under normal operating conditions.

In connection with the device so far developed, it will be seen that I have provided a device which provides controlled free wheeling without the necessity of interposing a free wheeling unit between the engine and the final drive. As soon as the engine is operating in high gear and at a substantial speed, all that it is necessary to do to free wheel, is to release the accelerator and to momentarily depress the clutch pedal from its automatic position into its manually clutched position and shortly thereafter, due to the engine dropping to idling speeds, weights 34 will cause separation of the clutch plates. The clutch pedal is then released and returned to its normal automatic position. The car will then coast as there is no torque transmitting connection between the engine and the rear wheels. When it is again desired to drive the vehicle under power of the engine, the engine is accelerated, which will cause the centrifugal mechanism to reengage the clutch members.

The invention may be embodied in other specific forms without departing from the spirit or essential characteristics thereof. The present embodiment is therefore to be considered in all respects as illustrative and not restrictive, the scope of the invention being indicated by the appended claims rather than the foregoing description, and all changes which come within the meaning and range of equivalent of the claims are therefore intended to be embraced therein.

What is claimed and desired to be secured by United States Letters Patent is:

1. In a drive and clutch mechanism, a driving member; a driving clutch plate associated with said driving member for rotation therewith and mounted for movement axially thereof; spring means urging said plate towards said driving member; weight levers extending through apertures in said driving member and, having a part thereof clamped between said driving member and said plate for causing said plate to move away from said driving member when said driving member reaches a predetermined speed; means for limiting the outward swing of said levers; and means for limiting the inward swing of said levers, whereby sudden deceleration of said driving member will not cause said levers to swing inwardly beyond their neutral positions, said means comprising a pair of concentric annular faces associated with said driving member.

2. In a drive and clutch mechanism, a driving member having a hub portion; a driven member having one end thereof journalled within said hub portion; automatic and positive clutch plates carried by said driving member; a driven clutch plate disposed between said automatic and positive plates and journalled on the outer periphery of said hub portion; centrifugally operable means associated with said automatic plate for causing the same to move into frictional driving engagement with said driven plate; and means connecting said driven plate to said driven member for rotation therewith, said means permitting free axial movement of said driven plate.

3. In an automatic clutch mechanism, driving and driven members mounted for engagement and disengagement; centrifugally operable mechanism adapted to apply forces of increasing magnitude to said members and cause pressure to be built up therebetween as said driving member is accelerated; and means for retarding the force exerting action of said centrifugally operable means when said driving member attains a predetermined speed, to thereby increase the speed range over which pressure is built up between said members, said last-named means comprising spring means operable to contact and retard movement of said driving member towards engaging position when it has attained said predetermined speed.

4. In an automatic clutch, in sub-combination, a frictional driving member and a reaction member mounted for synchronous rotation and for relative axial movement, resilient means urging said members toward each other; speed-responsive means for forcing said members away from each other against the action of said resilient means when said members attain a predetermined speed; and means acting against both of said members for automatically and yieldingly opposing separational movement of said members when they have been separated a predetermined extent by said speed responsive means.

5. The clutch mechanism described in claim 4, wherein said last-named means comprises a second resilient means operable to tend to urge said members toward each other when they have been separated a predetermined extent.

6. In an automatic clutch, a driving member and a reaction member mounted for synchronous rotation and for relative axial movement, resilient means urging said members toward each other; a driven element adapted to be engaged by said driving member; centrifugally operable means for forcing said driving member away from said reaction member into engagement with said driven element when said driving member attains a predetermined speed; a second resilient means for yieldingly resisting separational movement of said members when they have been separated a predetermined extent by said centrifugally operable means, and a third resilient means for establishing a two-stage yielding engagement pressure between said driving member and said driven element when they are engaged, and pressure is being built up therebetween by said centrifugally operable means.

7. The mechanism described in claim 6, wherein said driven element cooperates with a second driving member against which said third named resilient means is adapted to act.

8. In a clutch, in subcombination, a pair of members mounted for synchronous movement and adapted to undergo relative axial movement, resilient means tending to urge said members toward each other, centrifugally operable mechanism for forcing said members apart against the action of said resilient means when they attain a predetermined speed, and a second resilient means acting upon both of said members for automatically exerting a further yielding resistance to separational movement of said members when they have been forced apart a predetermined degree.

9. The clutch described in claim 8, wherein said second resilient means comprises a spring which is normally incapable of transmitting forces to said members when the latter are in contracted position.

10. In an automatic clutch, in sub-combination, a centrifugally operable weight assembly comprising a lever element having a head providing a reaction face and a fulcrum edge, said lever element also having a bearing face provided thereon, remote from said head and disposed at substantially right angles to the length of said lever; a mass member, and means for securing said mass member to said lever element in engagement with said bearing face, said means comprising a pair of threaded members integrally formed with said lever element and extending through apertures in said mass member.

11. In a power transmitting mechanism, a flywheel-like member mounted for rotation, a frictional clutch plate secured to said member for synchronous rotation therewith but which is capable of undergoing axial movement with respect thereto; resilient means normally urging said plate toward said member, comprising a headed bolt extending through an aperture in said member and connected to said plate, an element encircling said bolt and bridging the aperture in said member, and a compression spring bearing against the head of said bolt and said element, centrifugally operable means for forcing said plate away from said member when the latter attains a predetermined speed, and a second compression spring encircling said bolt and adapted to exert resisting forces upon the head of said bolt and said element when said plate has been moved to a predetermined distance away from said member under the influence of said centrifugally operable means.

WILLIAM E. HAUPT.